(12) United States Patent
Kim et al.

(10) Patent No.: US 10,339,182 B2
(45) Date of Patent: Jul. 2, 2019

(54) METHOD FOR STORING DATA BY USING CLOUD SERVICES AND APPARATUS THEREOF

(71) Applicant: SAMSUNG ELECTRONICS CO., LTD., Suwon-si (KR)

(72) Inventors: Sang-lae Kim, Suwon-si (KR); Jeong-hyun Yun, Suwon-si (KR); Kyung-ah Chang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 14/728,080

(22) Filed: Jun. 2, 2015

(65) Prior Publication Data
US 2015/0347404 A1 Dec. 3, 2015

(30) Foreign Application Priority Data
Jun. 2, 2014 (KR) .................. 10-2014-0067065

(51) Int. Cl.
| G06F 16/00 | (2019.01) |
| G06F 16/93 | (2019.01) |
| H04L 29/08 | (2006.01) |
| G06F 16/182 | (2019.01) |
| G06F 16/955 | (2019.01) |

(52) U.S. Cl.
CPC ............ *G06F 16/93* (2019.01); *G06F 16/183* (2019.01); *G06F 16/955* (2019.01); *H04L 67/06* (2013.01); *H04L 67/10* (2013.01); *H04L 67/1097* (2013.01)

(58) Field of Classification Search
CPC ...... G06F 16/93; G06F 16/183; G06F 16/955; H04L 67/06; H04L 67/1097; H04L 67/10
See application file for complete search history.

(56) References Cited

U.S. PATENT DOCUMENTS

| 9,325,791 | B1 * | 4/2016 | Blahaerath .......... H04L 67/1097 |
| 2011/0276538 | A1 * | 11/2011 | Knapp .................. G06F 17/302 707/626 |
| 2011/0277001 | A1 * | 11/2011 | Kaluskar ............. H04L 12/2818 725/80 |
| 2013/0085586 | A1 * | 4/2013 | Parekh ................. G11B 27/034 700/94 |
| 2013/0117240 | A1 * | 5/2013 | Taylor ............... G06F 17/30132 707/690 |
| 2013/0132463 | A1 * | 5/2013 | Garcia-Ascanio .......................... G06F 17/30174 709/203 |
| 2013/0219006 | A1 * | 8/2013 | Kuo .................... H04L 67/2814 709/213 |
| 2013/0226876 | A1 * | 8/2013 | Gati .................. G06F 17/30079 707/652 |

(Continued)

FOREIGN PATENT DOCUMENTS

| KR | 10-2011-0059430 A | 6/2011 |
| KR | 10-2011-0128487 A | 11/2011 |
| KR | 10-2011-0133709 A | 12/2011 |

*Primary Examiner* — Robert W Beausoliel, Jr.
(74) *Attorney, Agent, or Firm* — Sughrue Mion, PLLC

(57) ABSTRACT

A method of storing data includes receiving, by a network storage server, a request for transmitting a file from an external apparatus; obtaining information about a cloud storage, in which the file is stored; receiving the file from the cloud storage, based on the information about the cloud storage; and transmitting the received file to the external apparatus.

14 Claims, 12 Drawing Sheets

| | FILE IDENTIFICATION INFORMATION (310) | FILE ATTRIBUTE INFORMATION (320) | | | FILE ACCESS INFORMATION (330) | | FILE STORAGE INFORMATION (340) | |
|---|---|---|---|---|---|---|---|---|
| | | FILE NAME | FILE TYPE | IDENTIFICATION INFORMATION ABOUT CLOUD STORAGE | URL FOR FILE ACCESS | FILE IDENTIFICATION INFORMATION ABOUT CLOUD STORAGE | STORED FILE SIZE | STORAGE LOCATION |
| IDENTIFICATION INFORMATION OF NO. 1 FILE | | FILE1.XX | .doc | Google Drive | https://docs.google.com/document | SD12DW324 | 7M/7M | C:\FILE\FILE1.XX |
| IDENTIFICATION INFORMATION OF NO. 2 FILE | | FILE2.XX | .avi | Dropbox | https://www.dropbox.com/s/i04g/FOLDER1 | - | 8M/10M | C:\FILE\FILE12.XX |
| IDENTIFICATION INFORMATION OF NO. 3 FILE | | FILE3.XX | .jpg | Sugarsync | https://www.sugarsync.com/isy1/FILE2.xx | - | 0Byte | |

301

(56) References Cited

U.S. PATENT DOCUMENTS

| | | | |
|---|---|---|---|
| 2013/0238752 A1* | 9/2013 | Park | H04L 67/1097 709/217 |
| 2013/0305039 A1* | 11/2013 | Gauda | G06F 21/6218 713/153 |
| 2013/0332575 A1* | 12/2013 | Song | H04L 67/10 709/219 |
| 2015/0128215 A1* | 5/2015 | Son | H04L 67/1097 726/2 |

* cited by examiner

FIG. 3

| FILE IDENTIFICATION INFORMATION (310) | FILE ATTRIBUTE INFORMATION (320) | | FILE ACCESS INFORMATION (330) | | FILE STORAGE INFORMATION (340) | |
|---|---|---|---|---|---|---|
| | FILE NAME | FILE TYPE | IDENTIFICATION INFORMATION ABOUT CLOUD STORAGE | URL FOR FILE ACCESS | FILE IDENTIFICATION INFORMATION ABOUT CLOUD STORAGE | STORED FILE SIZE | STORAGE LOCATION |
| IDENTIFICATION INFORMATION OF NO. 1 FILE | FILE1.XX | .doc | Google Drive | https://docs.google.com/document | SD12DW324 | 7M/7M | C:₩FILE₩FILE1.XX |
| IDENTIFICATION INFORMATION OF NO. 2 FILE | FILE2.XX | .avi | Dropbox | https://www.dropbox.com/sf04g/FOLDER1 | — | 8M/10M | C:₩FILE₩FILE12.XX |
| IDENTIFICATION INFORMATION OF NO. 3 FILE | FILE3.XX | .jpg | Sugarsync | https://www.sugarsync.com/lsy1/FILE2.xx | — | 0Byte | |

301

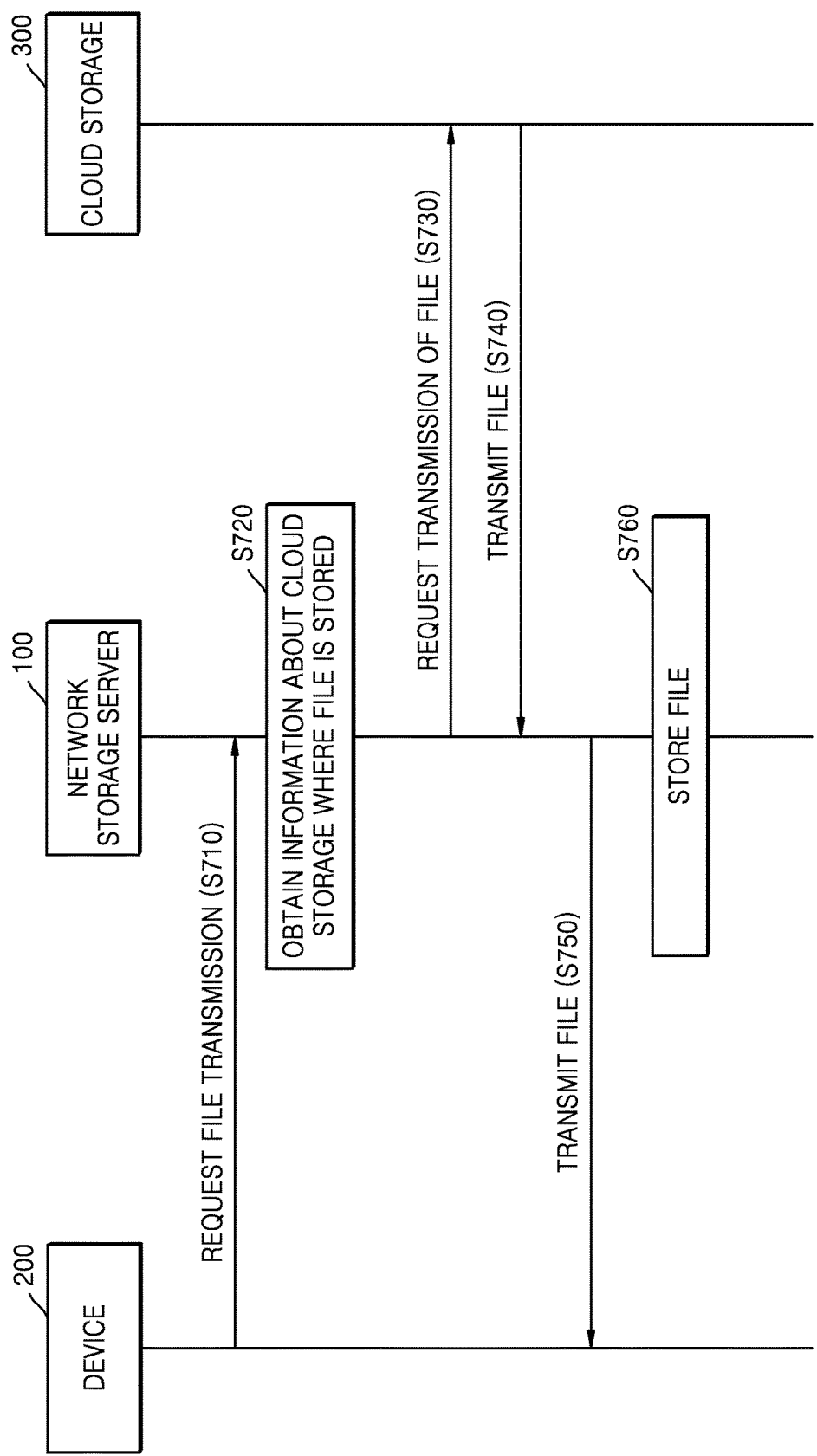

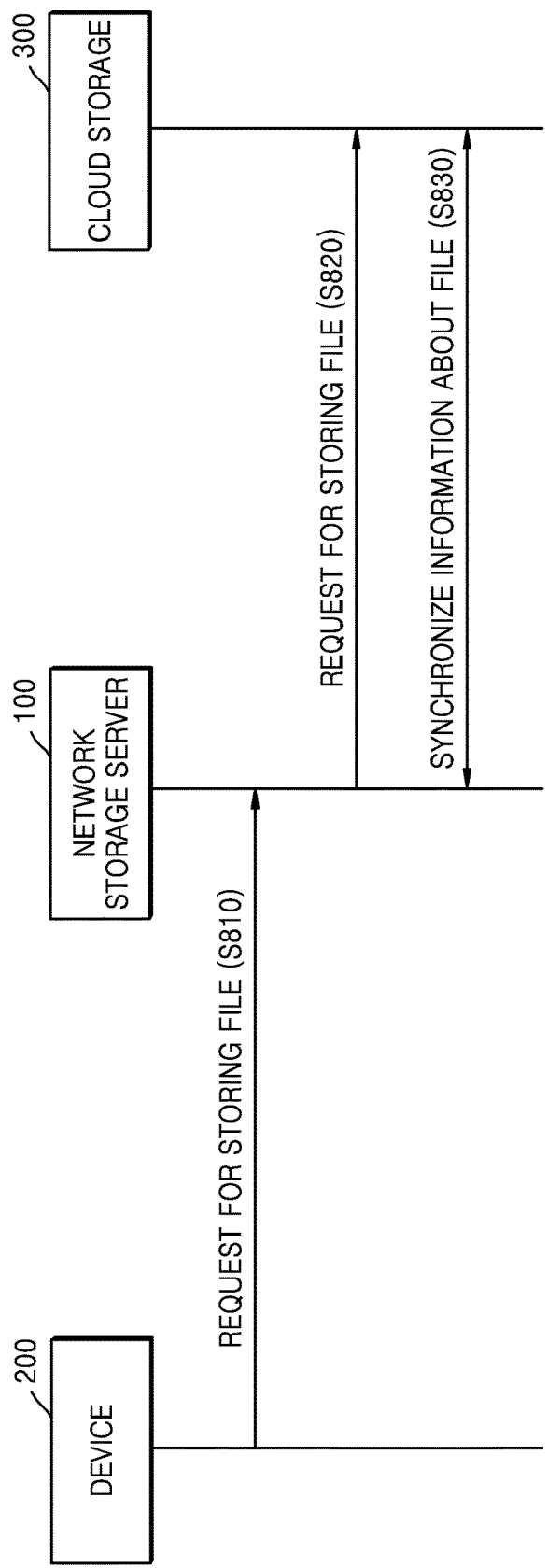

METHOD FOR STORING DATA BY USING CLOUD SERVICES AND APPARATUS THEREOF

CROSS-REFERENCE TO RELATED APPLICATION

This application claims priority from Korean Patent Application No. 10-2014-0067065, filed on Jun. 2, 2014, in the Korean Intellectual Property Office, the disclosure of which is incorporated herein in its entirety by reference.

BACKGROUND

1. Field

Methods and apparatuses consistent with exemplary embodiments relate to a method of storing data by using cloud services and an apparatus thereof.

2. Description of the Related Art

As multimedia technology and/or network technology develops, large-size or virtual storage apparatuses for storing data are introduced. For example, cloud storage may be used to provide a logical storage space through a network to a user.

Also, as home network technology develops, the performance of home electronic apparatuses is improved. Accordingly, there is an increasing need for utilizing resources of home networks and smart home electronic apparatuses for storing data. However, since the storing capacity of home electronic apparatuses is limited, a method for effectively utilizing resources of home electronic apparatuses for storing data is needed.

SUMMARY

One or more exemplary embodiments provide a method of storing data in a manner that a network storage server receives a transmission request for a file from a device, obtains information about a cloud storage where the file is stored, receives the file from the cloud storage, based on the obtained information about the cloud storage, and transmit the received file to the device.

According to an aspect of an exemplary embodiment, provided is a method of storing data, the method including: receiving, by a network storage server, a request for transmitting a file from an external apparatus; obtaining information about a cloud storage, in which the file is stored; receiving the file from the cloud storage, based on the information about the cloud storage; and transmitting the received file to the external apparatus.

The method may further include storing the file received from the cloud storage in the network storage server.

The receiving the file from the cloud storage may include determining whether the file is stored in the network storage server; selectively requesting the cloud storage for the file according to a result of the determining; and receiving the file from the cloud storage.

The method may further include receiving, from the external apparatus, a request for storing a certain file, stored in the external apparatus, in the cloud storage; receiving the certain file, stored in the external device, from the external apparatus; and storing the received certain file in the cloud storage.

The receiving the request for transmitting the file may include transmitting, to the external apparatus, information about at least one file transmittable from the cloud storage to the network storage server; and receiving the request for transmitting the file, according to a selection by a user, from among the at least one file.

The information about the at least one file may be received from the cloud storage.

The network storage server may include a home electronic apparatus, the home electronic apparatus including at least one from among a storage apparatus, a network apparatus, and a control apparatus.

According to an aspect of an exemplary embodiment, provided is a network storage server including: a storage configured to store at least one program; a transceiver configured to transmit and receive data; and a controller configured to execute the at least one program to control at least one from among the storage and the transceiver, wherein the controller is configured to receive a request for transmitting a file from an external apparatus through the transceiver, obtain information from the storage about a cloud storage, in which the file is stored, receive the file from the cloud storage through the transceiver, based on the information about the cloud storage, and transmit the received file to the external apparatus.

The controller may store the file received from the cloud storage in the storage of the network storage server.

The controller may determine whether the file is stored in the network storage server, selectively request the cloud storage for the file according to a result of determining whether the file is stored in the network storage server, and receive the file from the cloud storage.

The controller may receive, through the transceiver, a request for storing a certain file, stored in the external apparatus, in the cloud storage, receive the certain file, from the external apparatus, and store the certain file in the cloud storage.

The controller may transmit, to the external apparatus, information about at least one file transmittable from the cloud storage to the network storage server, and receive the request for transmitting the file, according to a selection by a user from among the at least one file.

The information about at least one file may be received from the cloud storage.

The network storage server may include a home electronic apparatus, the home electronic apparatus including at least one from among a storage apparatus, a network apparatus, and a control apparatus.

According to an aspect of an exemplary embodiment, provided is a non-transitory computer-readable recording medium storing a program including instructions, which, when executed by a computer, performs the above method.

According to an aspect of an exemplary embodiment, provided is an electronic apparatus including: at least one memory operable to store program code; at least one processor operable to read the program code and operate as instructed by the program code, the program code including: code that causes the at least one processor to obtain cloud storage service provider information that identifies a cloud storage service provider, in which a file is stored, among a plurality of cloud storage service providers, in response to receiving a request for the file from an external apparatus; code that causes the at least one processor to receive the file from the cloud storage service provider based on the cloud storage service provider information; and code that causes the at least one processor to transmit the received file to the external apparatus.

The request for the file may include identification information of the file, and the cloud storage service provider information may be obtained by using the identification information of the file.

The cloud storage service provider information may include uniform resource locator (URL) at which the file is accessible through the cloud storage service provider.

Information about at least one file, which is stored in the cloud storage service provider, may be stored in the at least one memory, and the information about the at least one file may be updated in response to a change to the at least one file in the cloud storage service provider.

The information about the at least one file may include at least one from among file identification information, file attribute information, file access information, and information on whether the at least one file is stored in the at least one memory.

BRIEF DESCRIPTION OF THE DRAWINGS

The above and/or other aspects will become more apparent by describing certain exemplary embodiments with reference to the accompanying drawings:

FIG. 3 is a table illustrating file control information stored in a network storage server according to an exemplary embodiment;

FIG. 7 is a diagram illustrating receiving a file from a network storage server in a device according to an exemplary embodiment;

FIG. 8 is a diagram illustrating storing a file in a cloud storage by using a network storage server according to an exemplary embodiment;

DETAILED DESCRIPTION

Figure 1:
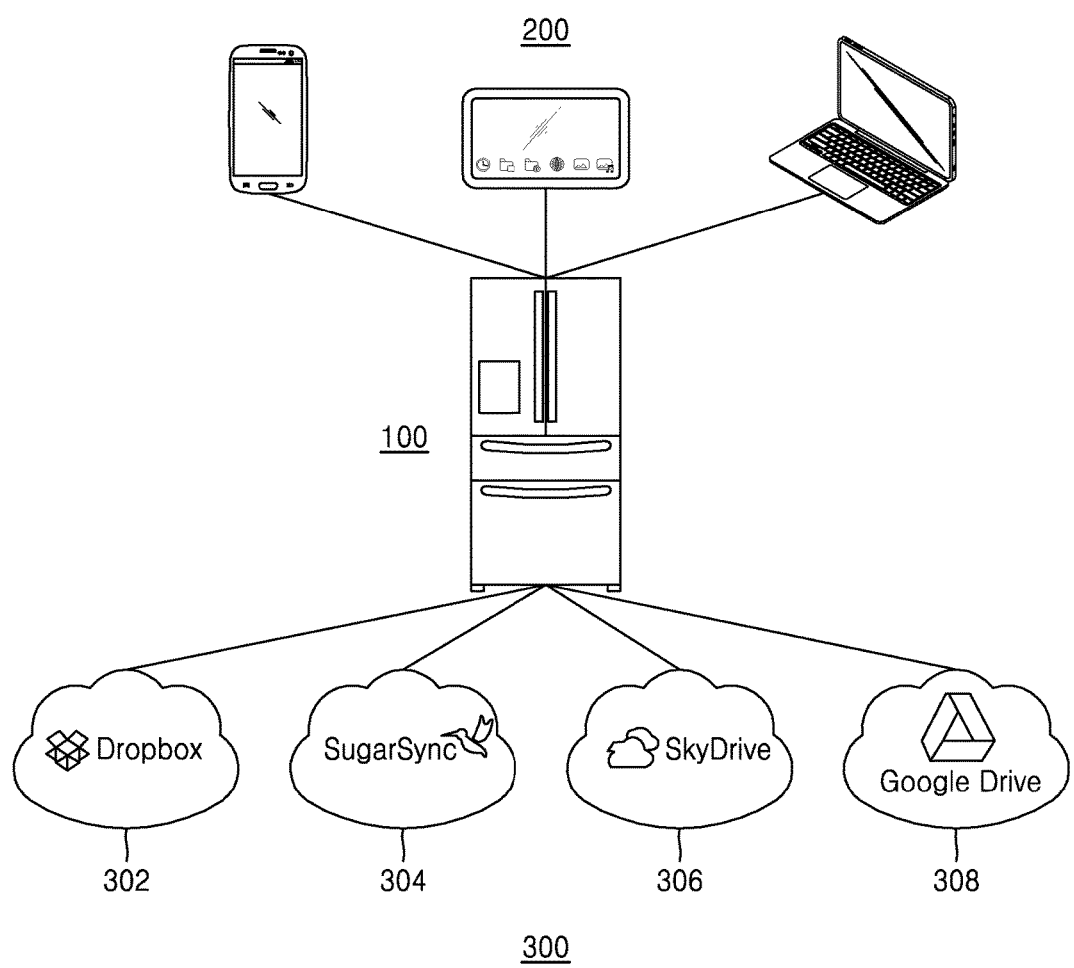
FIG. 1 is a block diagram illustrating a network storage server provided by using cloud services, according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments.

Thus, it is apparent that exemplary embodiments can be carried out without those specifically defined matters. Also, well-known functions or constructions are not described in detail since they would obscure exemplary embodiments with unnecessary detail. Expressions such as "at least one of," when preceding a list of elements, modify the entire list of elements and do not modify the individual elements of the list.

When certain part, throughout the specification, "includes" certain component factor, this description, unless other specific writing is presented, does not mean to exclude other component factors but means to further include other component factors. Also, a term such as "unit", "module", etc. described in the specification means an element executing at least one function or an operation, and may be realized as hardware, software, or a combination of hardware and software.

The term "file" refers to computer files generally used in a computer technology area, and may also include "folder" which combines files in a group.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. For example, components described in a single-package configuration may be provided in independent packages, and similarly, components in independent packages may be provided in a single-package configuration.

FIG. 1 is a block diagram illustrating a network storage server 100 provided by using cloud services, according to an exemplary embodiment.

Referring to FIG. 1, a cloud storage 300 may include services such as Dropbox 302, SugarSync 304, SkyDrive 306, and Google Drive 308 for providing a storage space accessible through a network. The cloud storage 300 may allocate a storage space to a user, based on user accounts. The cloud storage 300 may provide storage spaces in different sizes depending on the user's need. Also, the cloud storage 300 may allow a user to access data at a file level by establishing a file system. Accordingly, a device 200 connected with the network storage server 100 may access user data stored in the cloud storage 300 without limitations to time and a place, by using user account information.

The device 200 may be connected to the cloud storage 300 through network files, based on user accounts of the cloud storage 300, to store a file in a storage space allocated by the cloud storage 300 and/or receive a file stored in the storage space.

Also, the device 200 may store a file in the cloud storage 300 through the network storage server 100 and/or receive a file stored in the cloud storage 300 through the network storage server 100.

The network storage server 100 may connect the device 200 to the cloud storage 300 and provide the device 200 with access to data stored in the cloud storage 300. For example, the network storage server 100 may receive, from the cloud storage 300, a file requested by the device 200 and transmit the requested file to the device 200. Also, the network storage server 100 may store, according to a request from the device 200, a file received from the device 200, in the cloud storage 300.

Also, the network storage server 100 may operate as a cache storage apparatus by storing, in the network storage server 100, a file which is received from the cloud storage 300 and transmitted to the device 200 and/or a file which is received from the device 200 and stored in the cloud storage 300.

Also, the network storage server 100 may provide the device 200 with access to data at a file level by establishing a file system.

Also, the network storage server 100 may be connected to the device 200 through a short-distance network such as a home network. For example, the network storage server 100 may be connected to WiFi-Direct and transceive a file to and/or from the device 200. Also, the network storage server 100 may be connected to the device 200 through a wide area network such as the Internet.

The network storage server 100 may be referred to as a network-attached storage or network-attached cloud storage according to one or more exemplary embodiments.

The network storage server 100 may include, but not limited to, a desktop computer, a mobile phone, a smart phone, a laptop computer, a tablet personal computer (PC), an electronic book terminal, a digital broadcasting terminal, a personal digital assistant (PDA), a portable multimedia player (PMP), a navigation system, a moving picture experts group audio layer-3 (MP3) player, a digital camera, an internet protocol television (IPTV), a digital television (DTV), consumer electronic (CE) equipment such as a refrigerator and an air conditioner.

Also, the network storage server 100 may include smart home electronic equipment including a network apparatus, a storage apparatus, and a control apparatus. Home electronic equipment may operate as the network storage server 100 by installing a program in the home electronic equipment so that the home electronic equipment operates as a network storage. Also, a program that causes the home electronic equipment to operate as the network storage server 100 may be installed as a built-in program in the network storage server 100 when the home electronic equipment is produced.

Figure 2:
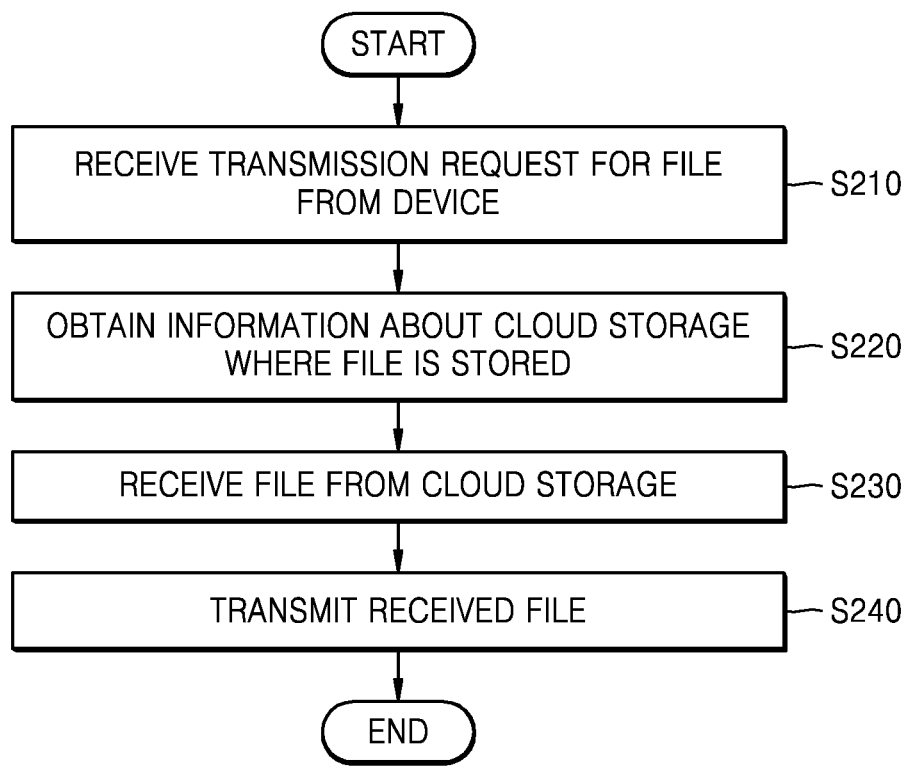
FIG. 2 is a flowchart illustrating a method of receiving a file stored in a cloud storage and transmitting the received file to a device by a network storage server according to an exemplary embodiment.

FIG. 2 is a flowchart illustrating a method of receiving a file stored in the cloud storage 300 and transmitting the received file to the device 200 by the network storage server 100, according to an exemplary embodiment.

In operation S210, the network storage server 100 may receive, from the device 200, a request for transmission of a file.

The network storage server 100 may receive, from the device 200, the request for transmission of a file that is selected by a user from among a list of files stored in the cloud storage 300.

For example, the network storage server 100 may transmit, to the device 200, a list of files accessible by the network storage server 100, from among files stored in the cloud storage 300, and information about individual files.

The device 200 may display the list of files, upon receiving the list of files, on a display of the device 200. Also, the device 200 may receive a user input which selects a file from among the displayed list of files and transmit a request for transmission of the selected file to the network storage server 100.

Accordingly, the network storage server 100 may receive the request for transmission of the file that is selected by a user from among the files accessible by the network storage server 100.

The network storage server 100 may receive the transmission request from the device 200 through a home network. Also, the network storage server 100 may receive the transmission request from the device 200 through an Internet network.

In operation S220, the network storage server 100 may obtain information about the cloud storage 300, in which a file requested by the device 200 is stored.

The network storage server 100 may receive identification information of a file requested by the device 200, based on the transmission request received from the device 200. As the identification information of a file is obtained, the network storage server 100 may obtain information about the cloud storage 300. In the network storage server 100, information about the cloud storage 300 for access to a file may be stored, corresponding to the identification information of the file. The information about the cloud storage 300 for access to a file may be received in advance from the cloud storage 300, in which a file is stored, and may be stored in the network storage server 100.

The information about the cloud storage 300 for access to a file may include information about uniform resource locator (URL) of the cloud storage 300, where a file is stored, and identification information of a file in the cloud storage 300.

In operation S230, the network storage server 100 may receive a file from the cloud storage 300, based on the stored information about the cloud storage 300.

The network storage server 100 may access the cloud storage 300 by using a URL of the cloud storage 300. Also, the network storage server 100 may request the cloud storage 300 to transmit a file to the network storage server 100. In this case, the network storage server 100 may transmit identification information and access permission information about a file in the cloud storage 300.

The cloud storage 300 may determine whether to permit the network storage server 100 to access the requested file, based on the received identification information of the file and access permission information about the file. Also, the cloud storage 300 may transmit the file corresponding to the identification information to the network storage server 100, based on the received identification information of the file.

Accordingly, the network storage server 100 may receive the file from the cloud storage 300.

In operation S240, the network storage server 100 may transmit, to the device 200 of a user, the file received from the cloud storage 300.

As the file is received from the cloud storage 300, the network storage server 100 may transmit the received file to the device 200. In this case, the network storage server 100 may store the received file in the network storage server 100 and then transmit the file to the device 200.

The network storage server 100 may transmit a file to the device 200 through a home network. Also, the network storage server 100 may transmit a file to the device 200 through an Internet network.

FIG. 3 is a table illustrating file control information stored in the network storage server 100 according to an exemplary embodiment.

Referring to FIG. 3, the network storage server 100 may receive, from the cloud storage 300, information about a user's file stored in the cloud storage 300 and store the information about a user's file in the network storage server 100.

For example, when a user's file stored in the cloud storage 300 is changed, or a new file is generated in a user's storage space in the cloud storage 300, or a stored file in the cloud storage 300 is deleted, the cloud storage 300 may transmit information about the change, generation, or deletion of a file to the network storage server 100.

As the information about a user's file is received, the network storage server 100 may generate or update file control information 301 corresponding to individual file. Accordingly, the network storage server 100 may synchronize the file control information 301 to information about the user's file stored in the cloud storage 300. For example, the file control information 301 may be automatically generated or updated in response to a change or generation of the user's file.

The file control information 301 may include file identification information 310, file attribute information 320, file access information 330, and file storage information 340 on whether a file is stored in the network storage server 100, etc.

The file identification information 310 of the network storage server 100 may indicate a unique identification value of a file, which may be used by the network storage server 100 to identify individual files. The network storage server 100 may store information about individual files corresponding to the file identification information 310.

The file attribute information 320 may include file name information, file type information, identification information about the cloud storage 300, where a file is stored, file size information, file generation time information, file change time information, etc. The file attribute information 320 may be referred to as metadata of a file according to one or more exemplary embodiments.

The file access information 330 may include URL information for access to a file and/or the file identification information 310 with respect to the cloud storage 300. According to one or more exemplary embodiments, URL information for access to a file may include the file identification information 310 of the file.

The file attribute information 320 and the file access information 330 may be received from the cloud storage 300. When the file attribute information 320 and the file access information 330 are received, the network storage server 100 may store the received file attribute information 320 and the file access information 330, corresponding to the file identification information 310.

Also, information on whether a file is stored in the network storage server 100, corresponding to the file identification information 310, may be stored in the network storage server 100. For example, the network storage server 100 may store storage location of a file and a size of the stored file, corresponding to the file identification information 310.

Figure 4:
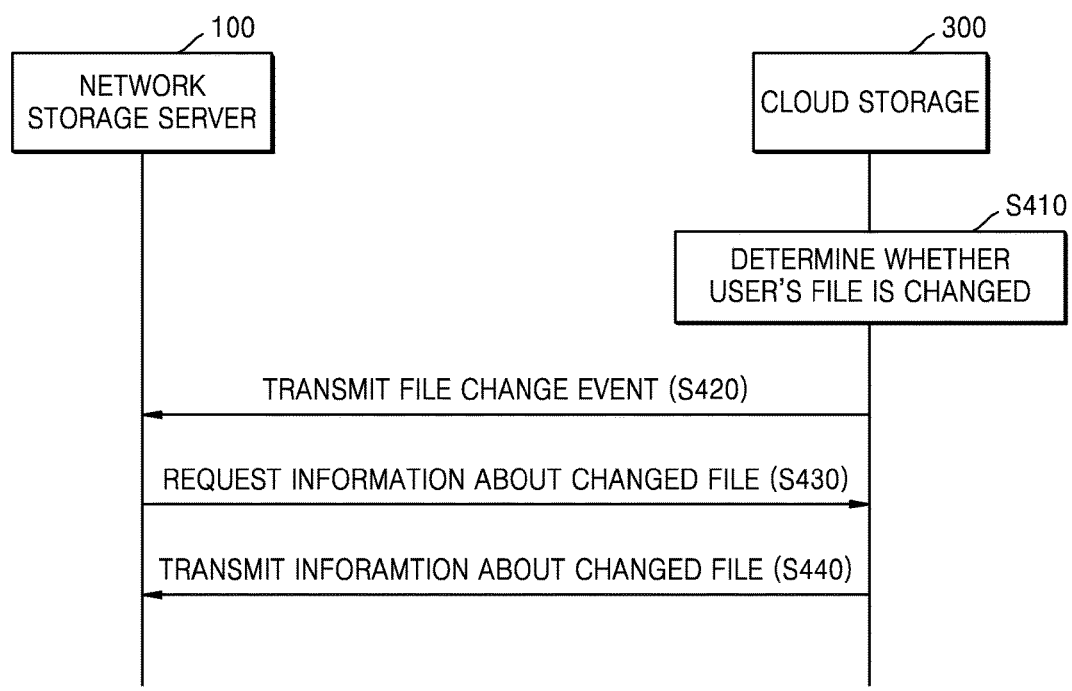
FIG. 4 is a diagram illustrating synchronizing between a network storage server and a cloud storage regarding information about a user's file stored in the cloud storage according to an exemplary embodiment.

FIG. 4 is a diagram illustrating synchronizing information about a user's file stored between the network storage server 100 and the cloud storage 300, according to an exemplary embodiment.

Referring to FIG. 4, the network storage server 100 may synchronize information about the user's file stored in the cloud storage 300, which is stored in the network storage server 100, with the cloud storage 300.

In operation S410, the cloud storage 300 may determine whether the user's file stored in the cloud storage 300 is changed.

The user's file stored in the cloud storage 300 may be changed in various ways. For example, the device 200 may be directly connected to the cloud storage 300 and may change, generate, or delete the user's file stored in the cloud storage 300. Also, the network storage server 100 may change, generate, or delete the user's file stored in the cloud storage 300 upon request from the device 200. Also, another device co-owning the user's file may change, generate, or delete the user's file stored in the cloud storage 300.

As the user's file stored in the cloud storage 300 is changed, generated, or deleted, the network storage server 100 may determine whether the user's file is changed, generated, or deleted.

In operation S420, the cloud storage 300 may transmit, to the network storage server 100, a file change event indicating that a user's file is changed.

When a change to a file occurs in a user's storage space in the cloud storage 300, the cloud storage 300 may be controlled to transmit the file change event indicating the change to the network storage server 100. For example, the cloud storage 300 may be controlled to transmit the file change event according to setting of the cloud storage 300. Accordingly, when a change occurs in the file in the user's storage space of the cloud storage 300, the cloud storage 300 may transmit, to the network storage server 100, the file change event indicating that the user's file is changed. The file change event may include the file identification information about a changed file.

In operation S430, the network storage server 100 may request the cloud storage 300 for information about the changed file.

In operation S440, the network storage server 100 may receive, from the cloud storage 300, the information about the changed file.

The information about the changed file may include attribute information about the changed file. Also, when a file is generated in a user's storage space, the information about the changed file may include attribute information about a generated file and information about the cloud storage 300 for access to a file.

The network storage server 100 may store the information about the changed file which is received from the cloud storage 300, corresponding to identification information of a file. Accordingly, the network storage server 100 may synchronize with the cloud storage 300 regarding information about the user's file stored in the cloud storage 300.

Figure 5:
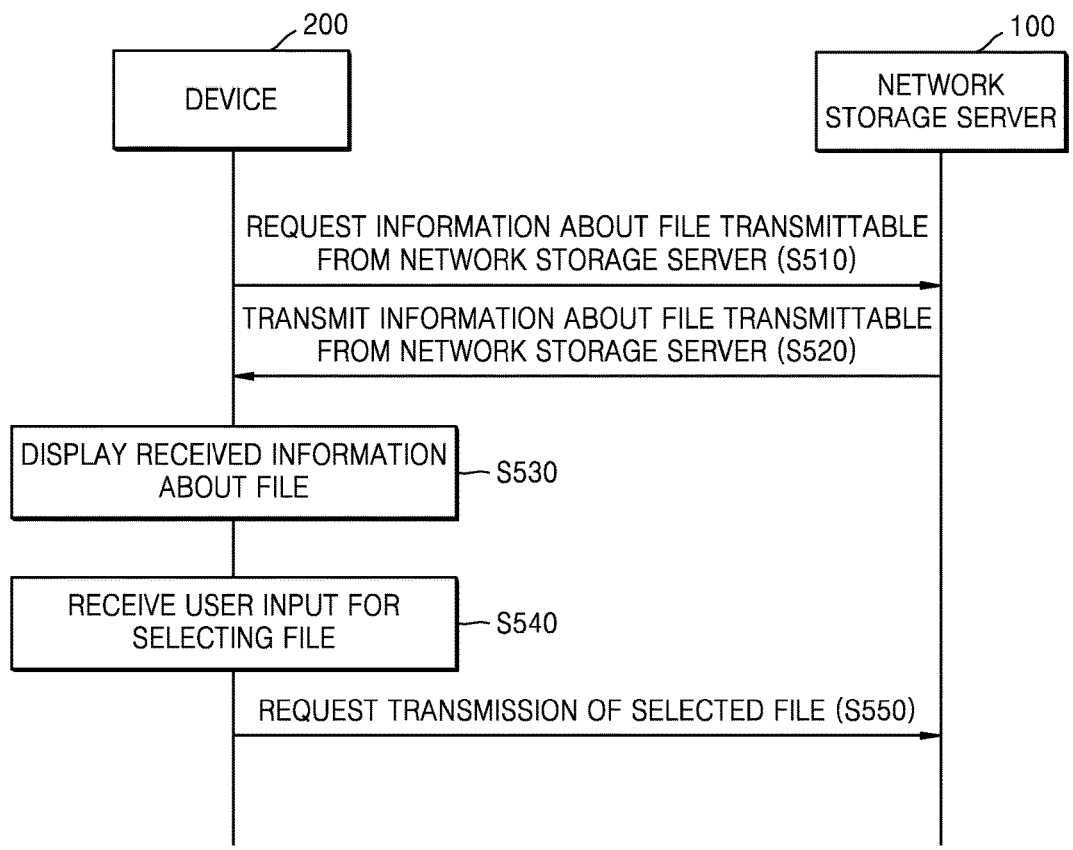
FIG. 5 is a diagram illustrating requesting for transmission of a file to a network storage server in a device according to an exemplary embodiment.

FIG. 5 is a flowchart illustrating requesting transmission of a file to the network storage server 100 in the device 200 according to an exemplary embodiment.

In operation S510, the device 200 may request the network storage server 100 for information about the file transmittable from the network storage server 100 to the device 200.

The information about the file transmittable from the network storage server 100 to the device 200 may indicate information about the file which the network storage server 100 may receive from the cloud storage 300 and transmit to the device 200.

In operation S520, the network storage server 100 may transmit, to the device 200, information about a file transmittable from the network storage server 100 to the device 200.

The network storage server 100 may obtain the information about the file transmittable from the network storage server 100 to the device 200, from file control information stored in the network storage server 100. The file control information may include file identification information, file attribute information, and information about whether a file is stored in the network storage server 100.

In operation S530, the device 200 may display information about a transmittable file received from the network storage server 100 on a display of the device 200.

The device 200 may display a list of files transmittable from the network storage server 100, based on the information about a transmittable file received from the network storage server 100.

For example, the device 200 may display a name of a transmittable file. Also, the device 200 may display, along with the file name, file attribute information and information about whether a file is stored in the network storage server 100 for the corresponding file.

Also, for example, when a file is a video, the device 200 may display a thumbnail image of a video frame received from the network storage server 100. Also, for example, when a file is a text file, the device 200 may display a portion of content of a text file received from the network storage server 100. A thumbnail image and a portion of content of a text file may correspond to the file attribute information and may be received from the network storage server 100.

A method of displaying a thumbnail image of a video frame and/or a portion of content of a text file prior to receiving a file may be referred to as a thumbnail file view service method.

In operation S540, the device 200 may receive a user input for selecting a file from a list of displayed files. In operation S550, the device 200 may request the network storage server 100 to transmit the file selected by a user. A request for transmission of the file may include file identification information of the selected file.

Figure 6A:
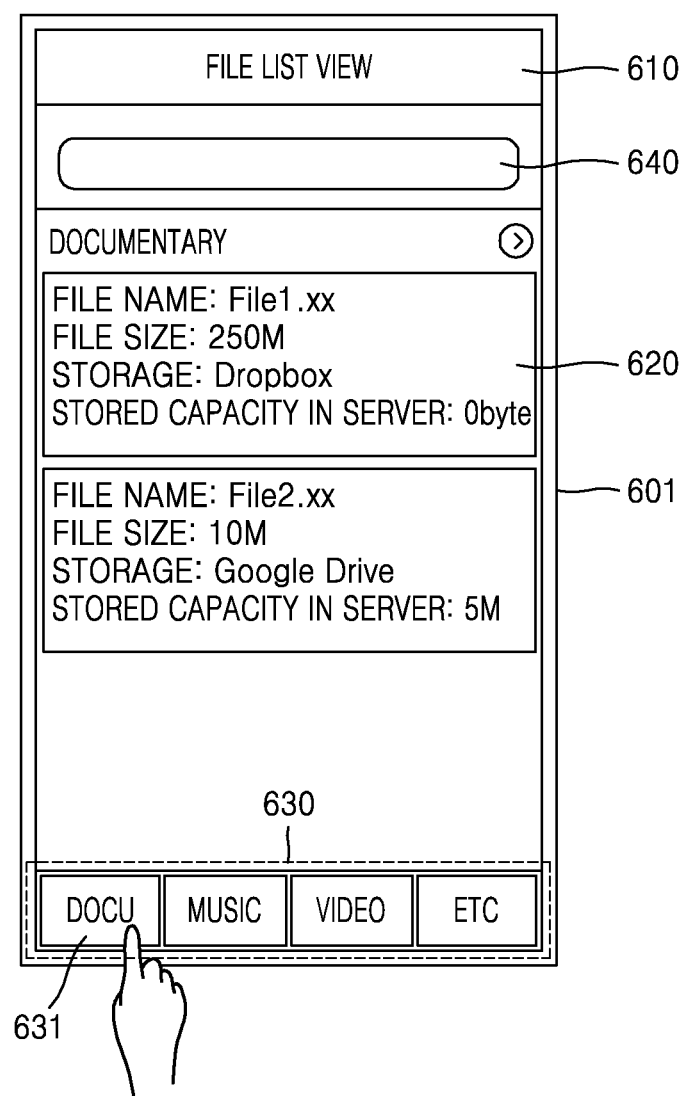
FIGS. 6A and 6B illustrate information about a file displayed in a device according to exemplary embodiments.
Figure 6B:
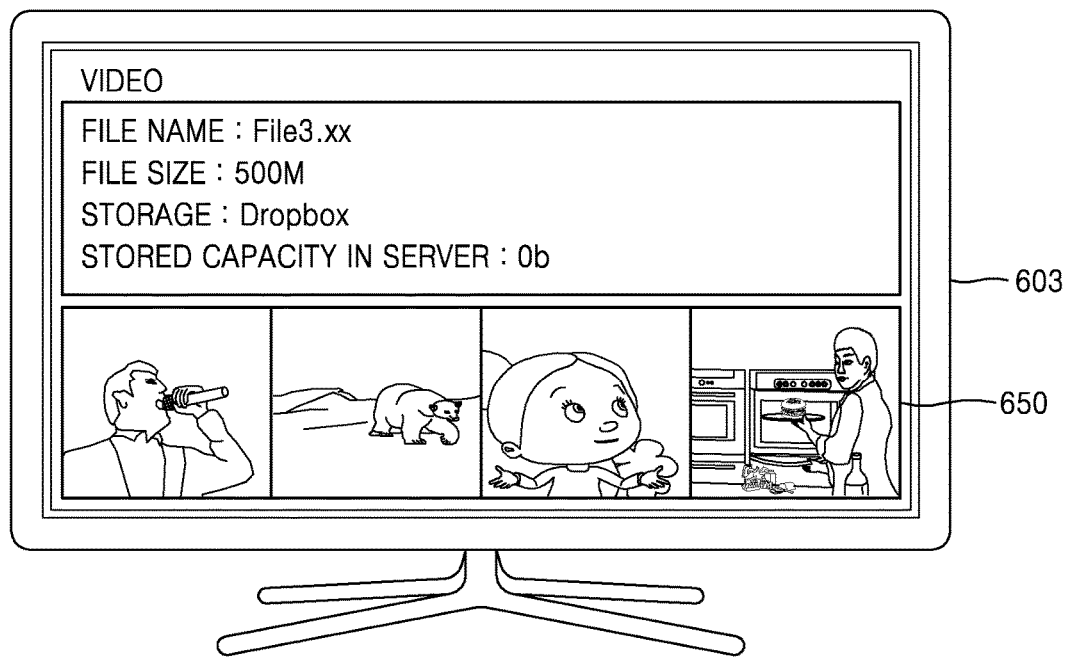

FIGS. 6A and 6B illustrate information about a file displayed in the device 200 according to exemplary embodiments.

The device 200 may receive, from the network storage server 100, information about the file transmittable from the network storage server 100 to the device 200. For example, the device 200 may receive, from the network storage server 100, a web page including information about the file.

Referring to FIG. 6A, the device 200 may display a list 610 of files on a display screen 601. Also, the device 200 may display information 620 about individual files. For example, the device 200 may display a file name, a file size, a name of the cloud storage 300, where the file is stored, and a capacity of the file which is stored in the network storage server 100.

Also, the device 200 may display a search window 640 for a file search. Also, the device 200 may display a user interface 630 to display a list of files according to a file type. For example, the device 200 may display information about a list of text files transmittable from the network storage server 100 and information about the transmittable text files, among files transmittable from the network storage server 100, when a user selects a text tab 631 of the user interface 630 to select a text file type.

Referring to FIG. 6B, the device 200 may display a thumbnail image 650 of a video frame, in a case of displaying information about a video file transmittable from the network storage server 100.

Also, the device 200 may receive a user input for selecting a file from a list of files displayed on a screen of a display 603 of the device 200. In response to receiving the user input for selecting the file, the device 200 may request the network storage server 100 to transmit the selected file to the device 200.

FIG. 7 is a diagram illustrating receiving a file from the network storage server 100 in the device 200 according to an exemplary embodiment.

In operation S710, in response to receiving a user input for selecting a file, the device 200 may request the network storage server 100 to transmit the selected file. In this case, the file transmission request may include file identification information of the selected file.

In operation S720, the network storage server 100 may obtain information about the cloud storage 300, where a file is stored.

The information about the cloud storage 300, where the file is stored, may be stored in the network storage server 100, corresponding to the file identification information.

The information about the cloud storage 300 may include at least one selected from among URL information for access to a file and the file identification information 310 with respect to the cloud storage 300, where the file is stored.

In operation S730, the network storage server 100 may request file transmission, based on the information about the cloud storage 300.

The file transmission request may include file identification information, with respect to the cloud storage 300, obtained in operation S720.

For example, the network storage server 100 may access the cloud storage 300, where the file is stored, by using the URL information obtained in operation S720. As the network storage server 100 accesses the cloud storage 300, the network storage server 100 may transmit the file identification information to the cloud storage 300 and request file transmission corresponding to the transmitted file identification information to the cloud storage 300.

In this case, the network storage server 100 may transmit, to the cloud storage 300, information about access authority for user's data.

The information about access authority for user's data may be received in advance from the cloud storage 300 and stored in the network storage server 100. For example, the device 200 may request the cloud storage 300 to transmit information about access authority for user's data to the network storage server 100. Accordingly, the cloud storage 300 may receive user account information from the device 200 and transmit access authority information to the network storage server 100, based on the received user account information.

In operation S740, the cloud storage 300 may transmit a requested file to the network storage server 100.

In response to receiving the transmission request including the file identification information 310, the cloud storage 300 may obtain a location where a file is stored, based on the file identification information 310. The cloud storage 300 may transmit the file to the network storage server 100, based on the location where the file is stored.

In operation S750, the network storage server 100 may transmit, to the device 200, the file received from the cloud storage 300.

Also, in operation S760, the network storage server 100 may store the received file in the network storage server 100. Also, the network storage server 100 may store information about the location where the file is stored and information about a size of at least a portion of a file stored in the network storage server 100 out of the total file size, corresponding to file identification information.

FIG. 8 is a diagram illustrating storing a file in the cloud storage 300 by using the network storage server 100 according to an exemplary embodiment.

In operation S810, the device 200 may transmit, to the network storage server 100, a request for storing the file stored in the device 200 in the cloud storage 300.

The file storing request may include file attribute information and/or file content. Also, the file storing request, which is transmitted to the network storage server 100 by the device 200, may include account information about a user of the device 200 with respect to the network storage server 100.

In operation S820, the network storage server 100 may transmit the file storing request to the cloud storage 300.

In response to receiving the file storing request from the device 200, the network storage server 100 may store the file received from the device 200 in the cloud storage 300.

For example, link information about a user's storage space in the cloud storage 300 may be stored in the network storage server 100, corresponding to user account information. Accordingly, the network storage server 100 may obtain link information about a user's storage space in the cloud storage 300, corresponding to user account information, and transmit, to the cloud storage 300, the file received from the device 200, by using the obtained link information. In this case, the network storage server 100 may transmit, to the cloud storage 300, information about access authority for user's storage space.

The cloud storage 300 may receive the file from the network storage server 100 and store the received file in the cloud storage 300. Also, the cloud storage 300 may generate identification information about the received file and store file attribute information and/or file content, corresponding to the generated identification information.

In operation S830, the cloud storage 300 and the network storage server 100 may be synchronized with each other regarding information about a file generated in the cloud storage 300.

The cloud storage 300 may transmit identification information and file attribute information of the generated file to the network storage server 100. Also, the cloud storage 300 may transmit, to the network storage server 100, link information for file access. Accordingly, the network storage server 100 may store information about a file which is received from the cloud storage 300 as the file control information.

Next, when the file is changed in the network storage server 100 and/or the cloud storage 300, the network storage server 100 and the cloud storage 300 may synchronize information about the file respectively stored therein.

Figure 9:
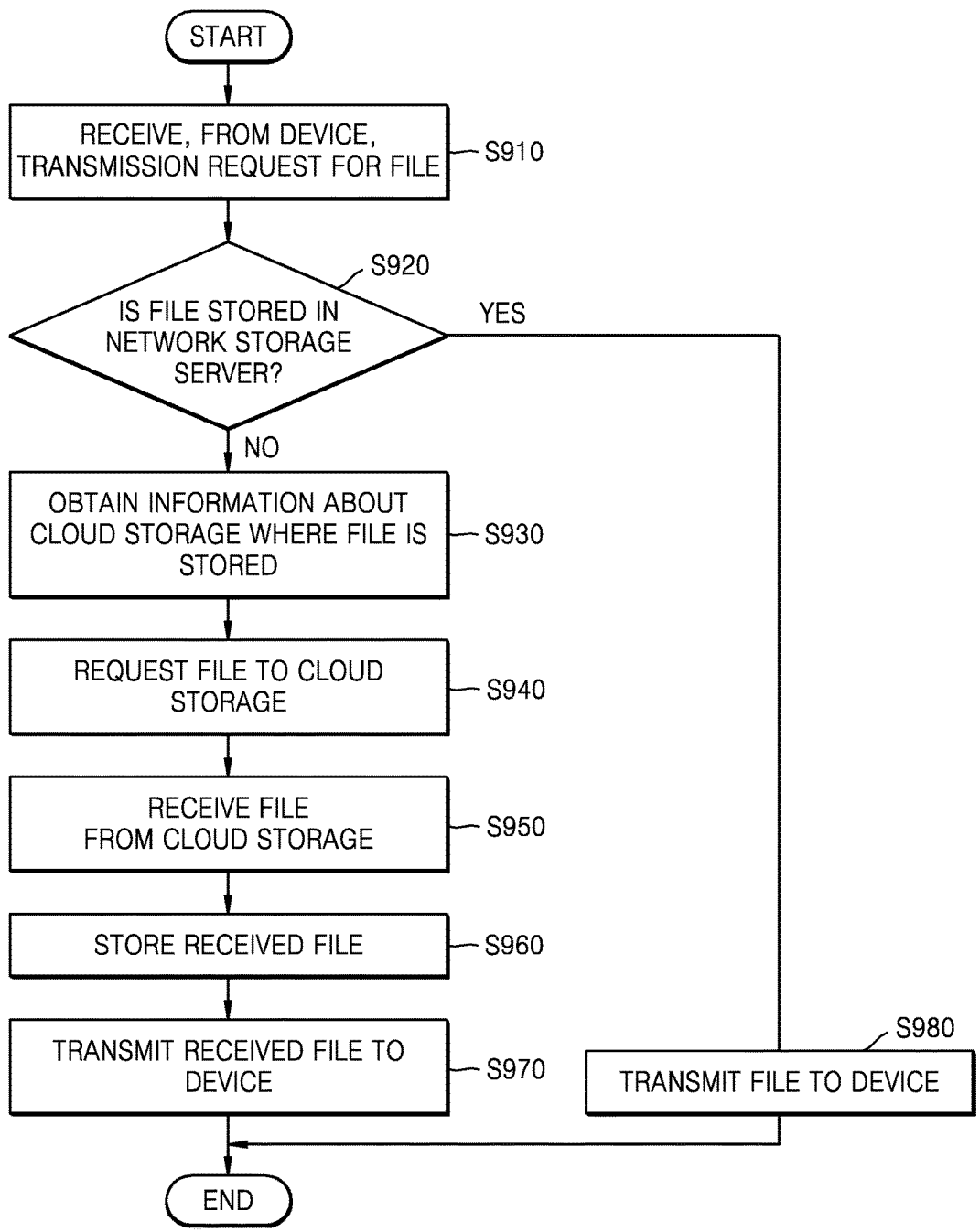
FIG. 9 is a flowchart illustrating a method of transmitting a file to a device in a network storage server according to an exemplary embodiment.

FIG. 9 is a flowchart illustrating a method of transmitting a file to the device 200 in the network storage server 100 according to an exemplary embodiment.

In operation S910, the network storage server 100 may receive a transmission request for a file from the device 200. The transmission request for the file may include file identification information of a file of which transmission is being requested.

In operation S920, the network storage server 100 may determine whether the file is stored in the network storage server 100.

In the network storage server 100, a size of the file stored in the network storage server 100 may be stored, corresponding to the file identification information. Accordingly, the network storage server 100 may determine whether the file of which transmission is requested is stored in the network storage server 100, based on the file identification information received from the device 200. Also, the network storage server 100 may obtain a size of at least a portion of the file stored in the network storage server 100 out of the total size of the requested file.

In response to determining that the file is not stored in the network storage server 100 in operation S920, the network storage server 100 may obtain, in operation S930, information about the cloud storage 300, where the file is stored.

The information about the cloud storage 300, where the file is stored, may be stored in the network storage server 100, based on the file identification information. The information about the cloud storage 300 may include at least one selected from URL information for file access and identification information of the file in the cloud storage 300, where the file is stored.

In operation S940, the network storage server 100 may request the cloud storage 300 for the file requested by the device 200.

The network storage server 100 may access the cloud storage 300, where a file is stored, by using URL information obtained in operation S930. When the network storage server 100 accesses the cloud storage 300, the network storage server 100 may transmit the identification information of the file and request for transmission of the file corresponding to the transmitted identification information of the file. In this case, the network storage server 100 may transmit, to the cloud storage 300, information about a user's access authority for data.

In operation S950, the network storage server 100 may receive, from the cloud storage 300, the requested file. In operation S960, the network storage server 100 may store the received file in the network storage server 100. Also, the network storage server 100 may store information about the location where the file is stored and information about a size of at least a portion of a file stored in the network storage server 100 out of a total size of the file. In operation S970, the network storage server 100 may transmit the received file to the device 200.

In response to determining that the file is stored in the network storage server 100 in operation S920, the network storage server 100 may transmit, in operation S980, the file stored in the network storage server 100 to the device 200.

Also, when a portion of the file is stored in the network storage server 100 in operation S920, the network storage server 100 may transmit, in operation S980, the portion of the file stored in the network storage server 100 to the device 200 and/or request the cloud storage 300 to transmit the file to the network storage server 100. In addition, the network storage server 100 may receive, from the cloud storage 300, the file or a portion of the file which is not stored in the network storage server 100 and transmit the received file or the portion of the file to the device 200.

Figure 10:
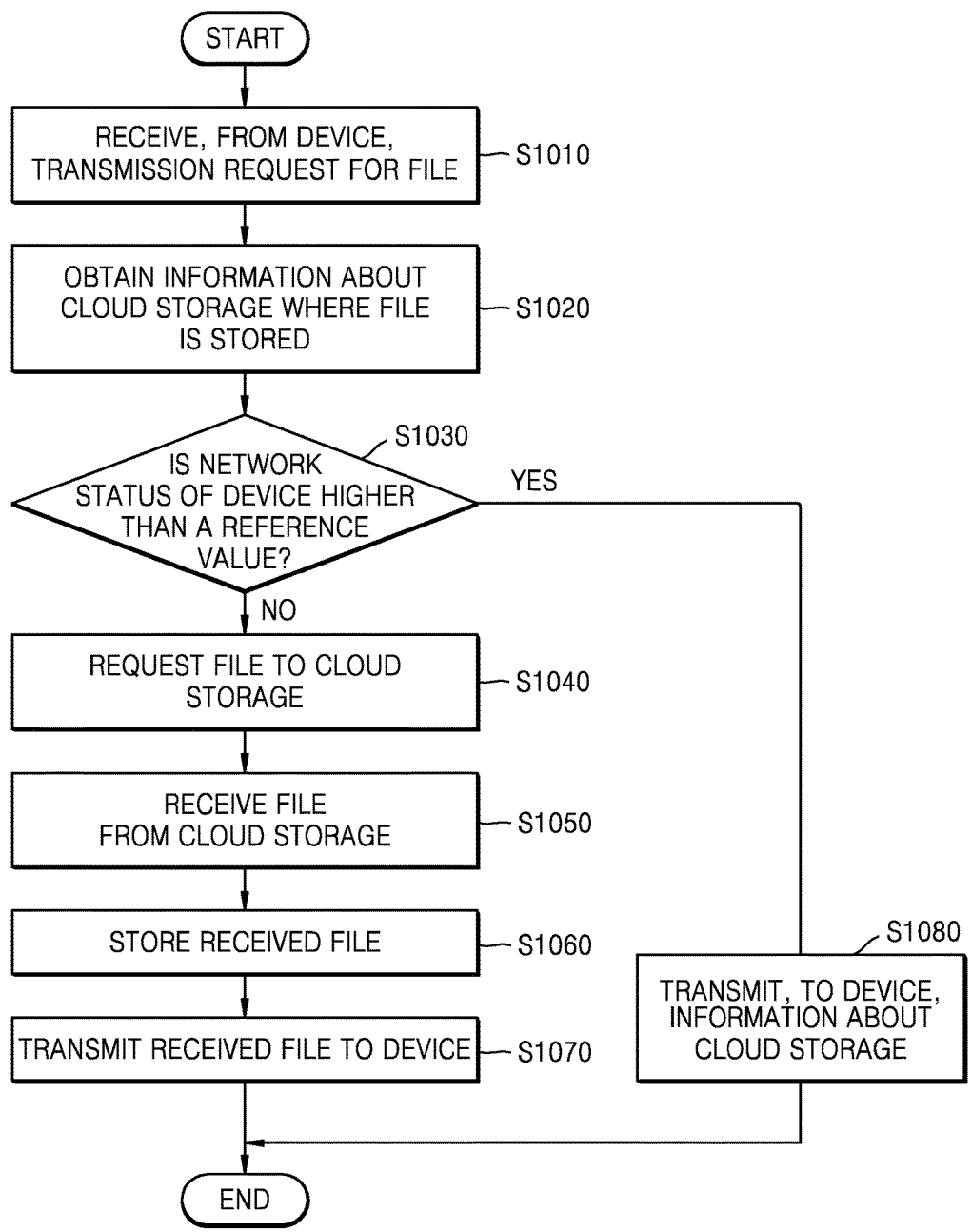
FIG. 10 is a flowchart illustrating a method of transmitting a file to a device in a network storage server according to another exemplary embodiment.

FIG. 10 is a flowchart illustrating a method of transmitting a file to the device 200 in the network storage server 100 according to another exemplary embodiment.

In operation S1010, the network storage server 100 may receive a file transmission request from the device 200. The file transmission request may include file identification information of a file of which transmission is being requested.

In operation S1020, the network storage server 100 may obtain information about the cloud storage 300, where the file is stored.

In operation S1030, the network storage server 100 may determine whether a network status of the device 200 is higher than a reference value.

The network status of the device 200 may indicate a status of a network where the device 200 and the cloud storage 300 are connected to each other. The network storage server 100 may receive, from the device 200, information about the network status of the device 200. Accordingly, the network storage server 100 may determine whether the network status of the device 200 is higher than a reference value.

In response to determining that the network status is lower than the reference value in operation S1030, the network storage server 100 may request, in operation S1040, the cloud storage 300, for the file requested by the device 200. In operation S1050, the network storage server 100 may receive, from the cloud storage 300, the file requested by the device 200. In operation S1060, the network storage server 100 may store the received file in the network storage server 100. In operation S1070, the network storage server 100 may transmit, to the device 200, the file stored in the network storage server 100.

In response to determining that the network status of the device 200 is higher than the reference value in operation S1030, the network storage server 100 may transmit, in operation S1080, to the device 200, the information about the cloud storage 300 which is obtained in operation S1020.

The information about the cloud storage 300, where the file is stored, may be stored in the network storage server 100, corresponding to the file identification information. The information about the cloud storage 300 may include at least one selected from URL information for file access and file identification information of a file in the cloud storage 300, where the file is stored. The URL information for file access may include identification information of the file in the cloud storage 300.

The device 200 may receive, from the network storage server 100, the information about the cloud storage 300. The device 200 may directly access the cloud storage 300, where the file is stored, using the received URL information. Also, when the device 200 accesses the cloud storage 300, the device 200 may transmit file identification information to the cloud storage 300 and request the cloud storage 300 for transmission of the file corresponding to the transmitted file identification information.

Figure 11:
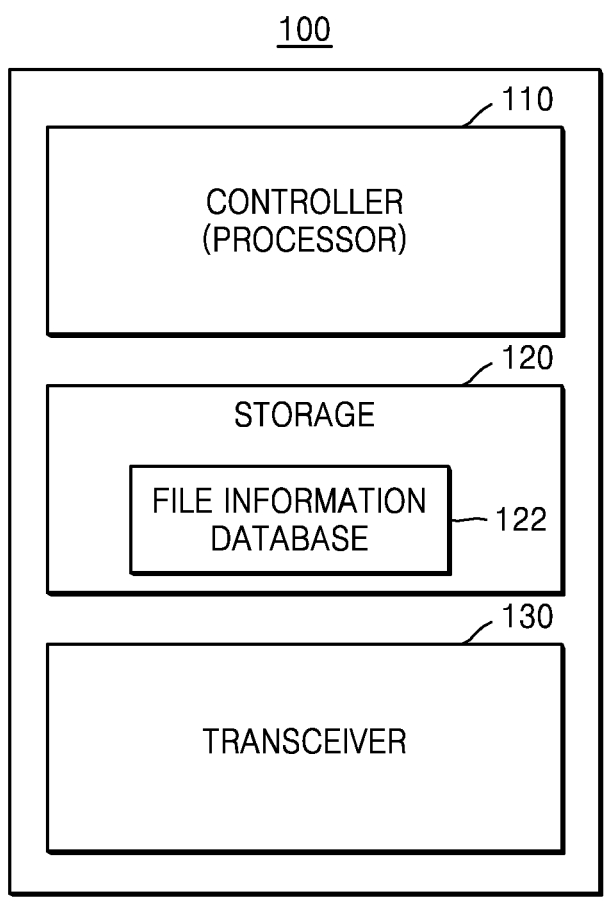
FIG. 11 is a block diagram illustrating a configuration of a network storage server according to an exemplary embodiment.

FIG. 11 is a block diagram illustrating a configuration of the network storage server 100 according to an exemplary embodiment.

As illustrated in FIG. 11, the network storage server 100 may include a controller 110, a storage 120, and a transceiver 130 according to an exemplary embodiment. However, all or some of the above illustrated components may not be essential components and thus may be omitted. The network storage server 100 may be implemented with more or less components than the illustrated components.

The controller 110 may control overall operation of the network storage server 100. For example, the controller 110 may control the storage 120 and the transceiver 130 by executing programs stored in the storage 120. The controller 110 may be, for example, a central processing unit (CPU).

The controller 110 may receive, from the device 200, a transmission request for a file through the transceiver 130. For example, the controller 110 may receive, from the device 200, a transmission request for a file selected by a user, from a list of files stored in the cloud storage 300.

Also, the controller 100 may obtain information about the cloud storage 300, where the file requested by the device 200 is stored. For example, the controller 110 may obtain identification information of the file requested by the device 200, based on the transmission request received from the device 200. When the identification information of the file is obtained, the controller 110 may obtain information about the cloud storage 300.

Also, the controller 110 may receive the file from the cloud storage 300 through the transceiver 130, based on the information about the cloud storage 300. For example, the controller 110 may access the cloud storage 300 by using a URL of the cloud storage 300. Also, the controller 110 may request the cloud storage 300 for transmission of the file to the network storage server 100. In this case, the controller 110 may transmit identification information of the file and/or access authority information for the file in the cloud storage 300.

Also, the controller 110 may transmit, to the device 200 of a user, through the transceiver 130, the file received from the cloud storage 300.

Also, the controller 110 may transmit, to the device 200, the file received from the cloud storage 300 after storing the file in the storage 120.

Also, the controller 110 may store information about individual files, corresponding to the file identification information.

The storage 120 may store file control information. The file control information may be stored in a database 122, where information about the file of a user is stored, included in the storage 120.

The file control information may include file identification information, file attribute information, file access information, and information about whether the file is stored in the network storage server 100. Also, the storage 120 may store a portion of the file stored in the cloud storage 300.

The storage 120 may include a storage medium of a type including at least one from among, for example, a flash memory type, a hard disk type, a multimedia card micro type, a card type memory such as a secure digital (SD) or extreme digital (XD) memory, a random access memory (RAM), a static random access memory (SRAM), a read-only memory (ROM), an electrically erasable programmable read-only memory (EEPROM), a programmable read-only memory (PROM), an electromagnetic memory, an electromagnetic disk, and an optical disk.

The transceiver 130 may include one or more components for providing communication between the network storage server 100 and the device 200, or between the network storage server 100 and the cloud storage 300. For example, the transceiver 130 may include a short-range wireless communicator, a mobile communicator, and a broadcasting receiver.

The short-range wireless communicator may include, but not limited to, a Bluetooth communicator, a Bluetooth low energy (BLE) communicator, a near field communicator, a WLAN (Wi-Fi) communicator, a ZigBee communicator, an infrared data association (IrDA) communicator, a Wi-Fi direct (WFD) communicator, an ultra wideband (UWB) communicator, an Ant+ communicator, etc.

The mobile communicator transmits or receives a wireless signal to/from at least one from among a base station, an external terminal, and a server on a mobile communication network. The wireless signal may include an audio call signal, a video telephony call signal, or various types of data depending on an embodiment of transceiving, for example, a text and/or multimedia message.

The broadcasting receiver receives a broadcasting signal and/or broadcasting-related information from an outside through a broadcasting channel. The broadcasting channel may include a satellite channel and/or a ground wave channel. Depending on an implementation, the network storage server 100 may not include the broadcasting receiver.

As described above, the exemplary embodiments provide a network storage apparatus by using cloud services for storing data.

According to an exemplary embodiment, examples of embodiments may be prepared in programs (or program codes or algorithms) executable on a computer and may be realized on a general-purpose, digital computer which executes programs by using a computer-readable recording medium. The computer-readable medium may be an arbitrary, usable medium and include all of volatile as well as non-volatile media, separable as well as in-separable type media. Also, the computer-readable medium may include all types of computer storage media and/or communication media. The computer storage media include all of volatile as well as nonvolatile media and separable as well as in-separable media that are realized by any methods or technology for storing information such as computer-readable commands, data structure, program modules, and other types of data. Communication media may include computer-readable commands, data structure, program modules, other types of data with modulated data signal such as a carrier wave, and other transmission mechanisms as well as any other types of information transmission media.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of storing data, the method performed by a network storage server, the method comprising:
storing at least one file control information corresponding to a plurality of files stored in a plurality of cloud storage, the plurality of cloud storage storing the plurality of files based on accounts of a user;
receiving, from the plurality of cloud storage, a file change event indicating that a user's file is changed and an information about the changed file, wherein the information about the changed file includes file attribute information about the changed file and cloud storage information for access to the changed file;
storing the changed file in correspondence to identification information of the changed file;
transmitting, to an external apparatus, information about at least one file transmittable from the plurality of cloud storage to the network storage server;
receiving, from the external apparatus, a request for a file and a network status of the external apparatus, via a home network;
in response to receiving the request for the file according to a selection by the user, identifying a cloud storage, in which the file is stored, from among the plurality of cloud storage, based on the at least one file control information;
receiving the file, from the cloud storage, via a wide area network; and
transmitting the received file to the external apparatus, via the home network,
wherein the at least one file control information comprises at least one of file identification information, the file attribute information, and file access information,
wherein the at least one file control information further comprises file storage information on whether the plurality of files are stored in the network storage server and a ratio of a size of a portion of a given file stored in the network storage server to a total file size of the given file, and
wherein, based on a determination that only a first portion of the requested file is stored in the network storage server based on the file storage information, the network storage server is configured to transmit the first portion of the file stored in the network storage server to the external apparatus, receive a second portion of the file which is not stored in the network storage server from the cloud storage, and transmit the received second portion of the file to the external apparatus.

2. The method of claim 1, further comprising:
storing the file received from the cloud storage in the network storage server.

3. The method of claim 1, wherein the receiving the file from the cloud storage comprises:
determining whether the file is stored in the network storage server;
selectively requesting the cloud storage for the file according to a result of the determining; and
receiving the file from the cloud storage.

4. The method of claim 1, further comprising:
receiving, from the external apparatus, a request for storing a certain file, stored in the external apparatus, in the cloud storage;
receiving the certain file, stored in the external apparatus, from the external apparatus; and
storing the received certain file in the cloud storage.

5. The method of claim 1, wherein the network storage server comprises a home electronic apparatus located in a home of the user.

6. A non-transitory computer-readable recording medium storing a program comprising instructions, which, when executed by a computer, performs the method of claim 1.

7. A network storage server comprising:
at least one memory configured to store at least one file control information corresponding to a plurality of files stored in a plurality of cloud storage, the plurality of cloud storage storing the plurality of files based on accounts of a user;
a transceiver configured to receive, from the plurality of cloud storage, a file change event indicating that a user's file is changed and an information about the changed file, wherein the information about the changed file include file attribute information about the changed file and cloud storage information for access to the changed file;
transmit to an external apparatus, information about at least one file transmittable from the plurality of cloud storage to the network storage server, and receive a request, from the external apparatus, for a file and a network status of the external apparatus, via a home network;
at least one processor configured to, store the changed file in correspondence to identification information of the changed file, in response to receiving the request for the file according to a selection by the user, identify a cloud storage, in which the file is stored, from among the plurality of cloud storage, based on the at least one file control information from the at least one memory, and
wherein the transceiver configured to, receive the file from the cloud storage via a wide area network, and
wherein the transceiver is configured to transmit the received file to the external apparatus via the home network,
wherein the at least one file control information comprises at least one of file identification information, the file attribute information, and file access information,
wherein the at least one file control information further comprises file storage information on whether the plurality of files are stored in the network storage server and a ratio of a size of a portion of a given file stored in the network storage server to a total file size of the given file, and
wherein, based on a determination that only a first portion of the requested file is stored in the network storage server based on the file storage information, the network storage server is configured to transmit the first portion of the file stored in the network storage server to the external apparatus, receive a second portion of the file which is not stored in the network storage server from the cloud storage, and transmit the received second portion of the file to the external apparatus.

8. The network storage server of claim 7, wherein the at least one processor is configured to store the file received from the cloud storage in the at least one memory of the network storage server.

9. The network storage server of claim 7, wherein the at least one processor is configured to determine whether the file is stored in the network storage server, selectively request the cloud storage for the file according to a result of determining whether the file is stored in the network storage server, and receive the file from the cloud storage.

10. The network storage server of claim 7, wherein the at least one processor is configured to receive, through the transceiver, a request for storing a certain file, stored in the external apparatus, in the cloud storage, receive the certain file, from the external apparatus, and store the certain file in the cloud storage.

11. The network storage server of claim 7, wherein the network storage server comprises a home electronic apparatus located in a home of the user.

12. The network storage server of claim 7, wherein the request for the file includes identification information of the file, and the cloud storage is identified by using the identification information of the file.

13. The network storage server of claim 7, wherein the file access information comprises uniform resource locator (URL) at which the file is accessible through the cloud storage.

14. The network storage server of claim 7, wherein information about at least one file, which is stored in the cloud storage, is stored in the at least one memory, and the information about the at least one file is updated in response to a change to the at least one file in the cloud storage.

* * * * *